United States Patent
Razumov

(10) Patent No.: US 9,505,556 B2
(45) Date of Patent: Nov. 29, 2016

(54) STORAGE SYSTEM USING LIFTING MECHANISM FOR COLLECTING CONTAINERS IN DESIRED SEQUENCE

(71) Applicant: Sergey N. Razumov, Moscow (RU)

(72) Inventor: Sergey N. Razumov, Moscow (RU)

(73) Assignee: OTTOS CONSULTANTS LTD., Paralimni (CY)

( * ) Notice: Subject to any disclaimer, the term of this patent is extended or adjusted under 35 U.S.C. 154(b) by 156 days.

(21) Appl. No.: 14/476,188

(22) Filed: Sep. 3, 2014

(65) Prior Publication Data

US 2016/0060037 A1 Mar. 3, 2016

(51) Int. Cl.
*B65G 1/137* (2006.01)
*B65G 1/06* (2006.01)
*B65G 1/04* (2006.01)

(52) U.S. Cl.
CPC .............. *B65G 1/1378* (2013.01); *B65G 1/04* (2013.01); *B65G 1/0471* (2013.01); *B65G 1/0492* (2013.01); *B65G 1/065* (2013.01)

(58) Field of Classification Search
CPC ........ B65G 1/00; B65G 1/06; B65G 1/0478; B65G 1/0457; B65G 1/0421; B65G 1/0425; B65G 1/026; B65G 1/04; B65G 1/0407; B65G 1/1378; B65G 1/0492; B65G 1/065; G06Q 10/08
USPC ................................ 700/213–216, 217, 228
See application file for complete search history.

(56) References Cited

U.S. PATENT DOCUMENTS 5,946,217 A * 8/1999 Lhoest ................... B65D 88/32
700/228
2004/0197171 A1* 10/2004 Freudelsperger .... B65G 1/1378
414/281

(Continued)

FOREIGN PATENT DOCUMENTS

DE         20211321 U1    1/2003
DE   10 2009 017 241 A1  10/2010

(Continued)

OTHER PUBLICATIONS

International Search Report and Written Opinion dated Nov. 18, 2015, issued in corresponding International Application No. PCT/IB2015/056327.

*Primary Examiner* — Patrick Cicchino
(74) *Attorney, Agent, or Firm* — McDermott Will & Emery LLP

(57) ABSTRACT

A storage system having multiple storage sections, each configured for storing containers in storage cells arranged in multiple rows at various horizontal levels with respect to ground. Multiple sets of lifting transportation devices are configured for moving in a first horizontal direction along pairs of rails arranged at respective first predetermined horizontal levels in passages between adjacent storage sections. Multiple container carriages corresponding to respective sets of the lifting transportation devices are configured for moving in a second horizontal direction substantially perpendicular to the first horizontal direction. A lifting sequencer is configured for moving in a vertical direction to receive containers from the multiple container carriages and provide a sequence of containers arranged in a predetermined order.

12 Claims, 16 Drawing Sheets

(56) References Cited

U.S. PATENT DOCUMENTS

| | | | | |
|---|---|---|---|---|
| 2006/0158043 A1* | 7/2006 | Brouwer | ............... | B63B 25/22 |
| | | | | 307/149 |
| 2011/0008137 A1* | 1/2011 | Yamashita | ............ | B65G 1/0492 |
| | | | | 414/267 |
| 2012/0101627 A1* | 4/2012 | Lert | ............... | B65G 1/1378 |
| | | | | 700/216 |
| 2014/0133943 A1* | 5/2014 | Razumov | ............ | B65G 1/0492 |
| | | | | 414/281 |
| 2014/0212257 A1 | 7/2014 | Yamashita | | |
| 2015/0081089 A1* | 3/2015 | Kapust | ............... | B65G 1/1373 |
| | | | | 700/218 |
| 2015/0225187 A1* | 8/2015 | Razumov | ............ | B65G 1/0471 |
| | | | | 414/279 |
| 2015/0291357 A1* | 10/2015 | Razumov | ............ | B65G 1/1373 |
| | | | | 414/279 |
| 2015/0353282 A1* | 12/2015 | Mansfield | ............ | G05D 1/00 |
| | | | | 700/214 |
| 2016/0016731 A1* | 1/2016 | Razumov | ............ | B65G 1/0492 |
| | | | | 414/279 |

FOREIGN PATENT DOCUMENTS

| | | |
|---|---|---|
| JP | 7-117815 A | 5/1995 |
| JP | 2000-044010 A | 2/2000 |

\* cited by examiner

STORAGE SYSTEM USING LIFTING MECHANISM FOR COLLECTING CONTAINERS IN DESIRED SEQUENCE

TECHNICAL FIELD

This disclosure relates to retail logistics, and more particularly, to a storage system having a multi-level storage arrangement incorporating a lifting mechanism configured for collecting containers from storage racks and supplying them to a container processing point in a desired sequence.

BACKGROUND ART

Operations performed in a storage facility, such as a warehouse or a retail store's storage area, often require that storage containers are collected from storage racks in a predetermined order. For example, a desired sequence of containers may be collected for loading onto pallets or for loading onto trucks.

Also, containers may be collected from storage racks to perform order picking operations that involve extracting ordered goods from collected containers, and placing the goods in one or more containers to prepare a customer's order. Containers may be supplied to a human picking operator or a picking device in a predetermined sequence so as to enable the operator or picking device to sequentially pick items required to fulfill orders. An order may include multiple products that should be packed in a specific sequence. For example, heavy products need to be placed at the bottom of the container, while lightweight products may be placed after the heavy products. In this case, to efficiently fulfill the order, it would be desirable for each order to provide a picker with containers with the heavy products before containers with the lightweight products.

Further, it would be convenient to provide a picker with containers in a predefined sequence so as to enable the picker to place some items of an order separately from other items. For example, frozen products have to be placed separately from fresh products, food items need to be placed separately from chemical items, etc.

Conventional storage systems involve complex and expensive equipment for collecting containers in a desired order. Therefore, it would be desirable to develop a new storage arrangement in which a desired sequence of containers can be collected using inexpensive devices in an efficient manner so as to reduce the logistics cost.

SUMMARY OF THE DISCLOSURE

In accordance with one aspect, the present disclosure offers a storage system having multiple storage sections, each configured for storing containers in storage cells arranged in multiple rows at various levels with respect to ground. Multiple sets of lifting transportation devices are configured for moving in a first horizontal direction along pairs of first rails arranged at respective first predetermined levels in passages between adjacent storage sections. Multiple container carriages corresponding to respective sets of the lifting transportation devices are configured for moving in a second horizontal direction substantially perpendicular to the first horizontal direction, along second rails arranged at respective second predetermined levels different from the first predetermined levels. A lifting sequencer is configured for moving in a vertical direction to receive containers from the multiple container carriages and provide a sequence of containers arranged in a predetermined order.

Each lifting transportation device of a set includes a container access mechanism movable in a vertical direction with respect to a corresponding pair of the first rails so as to take a container stored in the adjacent storage sections and place the container to a selected storage cell accessible by a container carriage corresponding to the set.

A first lifting transportation device of the set movable along a first passage between the storage sections is configured to place a container to a first selected storage cell accessible by the container carriage corresponding to the set, and a second lifting transportation device of the set movable along a second passage between the storage sections is configured to place a container to a second selected storage cell accessible by the container carriage corresponding to the set.

Each lifting transportation device may be configured to access multiple rows of storage cells arranged above the corresponding pair of the first rails, and to access multiple rows of storage cells arranged below the corresponding pair of the first rails.

The container carriage has a frame configured for moving along a respective second rail, and a board for carrying containers, the container carriage is configured to set the board at first and second horizontal positions with respect to the frame, where the first horizontal position is higher than the second horizontal position.

When the board is set at the first horizontal position, the container carriage is configured to access the first and second selected storage cells, and when the board is set at the second horizontal position, the container carriage is configured to carry containers between the first passage and the second passage under a selected row of storage cells arranged above the respective second rail.

Each container carriage may be configured to supply the lifting sequencer with containers collected from multiple storage sections separated by at least one passage.

In an exemplary embodiment, the lifting sequencer may include a lifting platform movable in a vertical direction to take containers from multiple container supporting units respectively arranged at multiple levels corresponding to the second predetermined levels at which the second rails are arranged.

The lifting sequencer may be configured to supply the containers taken by the lifting platform to a container processing section.

A return lifting sequencer may be configured for returning containers processed in the container processing section to the storage sections. The processed containers may be returned in a desired order.

In accordance with a method of the present disclosure, containers are supplied for processing in a storage system having multiple storage sections, each configured for storing containers in storage cells arranged in multiple storage rows at various levels with respect to ground; multiple sets of lifting transportation devices configured for moving in a first horizontal direction in passages between adjacent storage sections; multiple container carriages corresponding to respective sets of the lifting transportation devices and configured for moving in a second horizontal direction substantially perpendicular to the first horizontal direction; and a lifting sequencer. The following steps are carried out to supply the containers in a predetermined sequence:

controlling a first lifting transportation device of a first set of the lifting transportation devices to take a first container stored in a first storage section in a first group of storage rows assigned to the first lifting transportation device;

controlling a second lifting transportation device of a second set of the lifting transportation devices to take a first container stored in a second storage section in a second group of storage rows assigned to the second lifting transportation device, the first group of storage rows being arranged at a different level than the second group of storage cells, the first and second storage sections being separated by a third storage section;

controlling the first lifting transportation device to place the first container to a first selected storage cell accessible by a first container carriage corresponding to the first set, controlling the second lifting transportation device to place the second container to a second selected storage cell accessible by a second container carriage corresponding to the second set;

positioning a board of the first container carriage in an upper position to take the first container from the first selected storage cell, positioning the board of the first container carriage in a lower position to carry the first container below a selected storage row in the third storage section to a first selected container receiving point, controlling the second container carriage to take the second container from the second selected storage cell and carry the second container to a second selected container receiving point arranged at a different level than the first selected container receiving point, and controlling the lifting sequencer to move in a vertical direction to access the first and second selected receiving points so as to receive the first and second containers and supply the first and second containers for processing in a predetermined sequence.

After the processing, the first and second containers may be returned to the storage sections in a desired order.

The first group of storage rows may include multiple storage rows arranged above a first horizontal path along which the first lifting transportation device moves, and multiple storage rows arranged below the first horizontal path, and the second group of storage rows includes multiple storage rows arranged above a second horizontal path along which the second lifting transportation device moves, and multiple storage rows arranged below the second horizontal path. The first horizontal path is provided at a different level than the second horizontal path.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using examples of order fulfillment procedures. It will become apparent, however, that the concept of the disclosure is applicable to forming a desired sequence of containers in any retail or warehouse environment.

Figure 1:
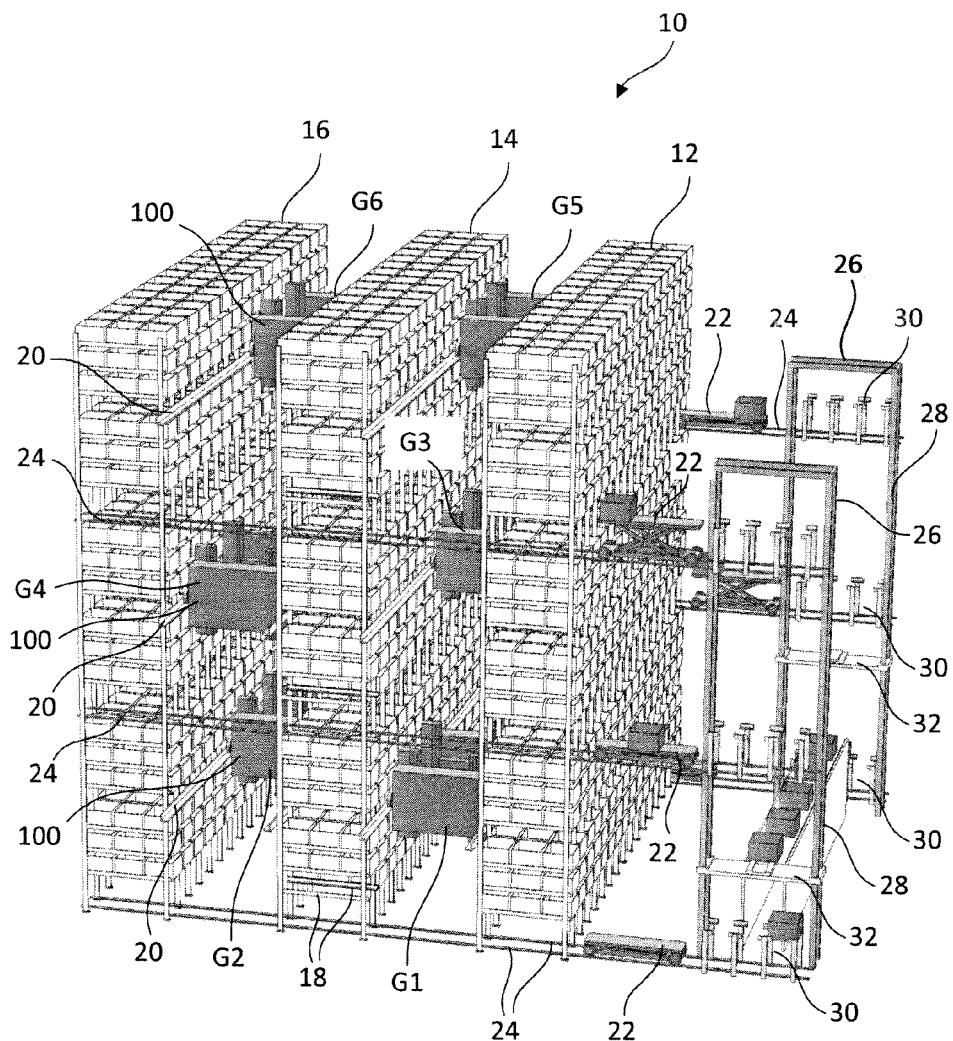
FIG. 1 shows an exemplary embodiment of a storage system in accordance with the present disclosure.

FIG. 1 illustrates an exemplary embodiment of a storage system 10 in accordance with the present disclosure. The storage system 10 may be arranged in a warehouse, order fulfillment center or retail facility. The storage system 10 may have multiple storage racks including storage racks 12, 14 and 16, each of which is configured for storing containers in storage cells arranged in multiple rows at various levels with respect to the ground. The containers may be any objects capable of holding goods stored in the storage area, such as cartons, boxes, crates, or pallets. The containers may be held in each row of the storage racks 12, 14 and 16 using holding elements 18 configured for holding containers. For example, a pair of L-shaped holding elements 18 may be used to hold containers in each row of the respective storage rack.

Each row of the storage racks 12, 14 and 16 may contain multiple containers arranged in two mutually perpendicular horizontal directions. The storage racks 12, 14 and 16 may be arranged so as to provide passages between them. Multiple sets of lifting transportation devices 100 may be provided in each passage to handle containers stored in the storage racks 12, 14 and 16 from both sides of each passage. For example, FIG. 1 shows three sets of the lifting transportation devices. A first set includes the lifting transportation devices G1 and G2 arranged at a lower level. A second set arranged at an intermediate level includes the lifting transportation devices G3 and G4. A third set arranged at a higher level includes the lifting transportation devices G5 and G6. The lifting transportation devices G1, G3 and G5 are configured for moving along a passage between the storage racks 12 and 14. The lifting transportation devices G2, G4 and G6 are configured for moving along a passage between the storage racks 14 and 16. Although FIG. 1 shows three sets of the lifting transportation devices 100 moving along passages between three storage racks, the storage system 10 may include any desired number of sets of the lifting transportation devices arranged at different levels, and any number of storage racks arranged so as to provide passages between adjacent racks.

Each lifting transportation device 100 is configured for moving in a horizontal direction along a pair of horizontal rails 20 arranged in the respective passage between the storage racks so as to have access to containers arranged in the storage racks on both sides of the passage. As discussed in more detail below, the lifting transportation device 100 includes a frame movable along the pair of rails 20 and a movable platform configured to move in a vertical direction up and down with respect to the frame so as to handle containers provided above and below the rails 20. In particular, a lifting transportation device 100 may take a container from one selected row of the storage cells, and may unload that container to another selected row of the storage cells. The container may be placed to the same storage rack from which the container is taken. Alternatively, the container may be taken from one storage rack and placed to the storage rack arranged from the opposite side of the respective passage.

In particular, a first group of storage rows above and below the lower pair of rails 20 in FIG. 1 may be assigned for access by the lifting transportation devices G1 and G2 of the first set, a second group of storage rows above and below the intermediate pair of rails 20 may be assigned for access by the lifting transportation devices G3 and G4 of the second set, and a third group of storage rows above and below the upper pair of rails 20 may be assigned for access by the lifting transportation devices G5 and G6 of the third set. The lifting transportation devices 100 are configured for taking containers from one row of the assigned group and placing the containers to another row of the assigned group.

Further, the system 10 includes container carriages 22 movable in a horizontal direction substantially perpendicular to the horizontal direction in which the lifting transportation device 100 moves. The container carriages 22 may be arranged at multiple levels corresponding to the respective sets of the lifting transportation devices 100. FIG. 1 shows a pair of container carriages 22 at each level. However, any desired number of container carriages 22 may be provided at each level. Moreover, the concept of the present disclosure may be implemented using a single container carriage 22 at each level.

FIG. 1 illustrates a first pair of the container carriages 22 arranged at a lower level, a second pair of the container carriages 22 arranged at an intermediate level above the first pair, and a third pair of the container carriages 22 arranged at a higher level above the second pair.

The storage cells in each row of the storage sections 12, 14 and 16 are arranged in multiple parallel lines extending in the horizontal direction substantially perpendicular to the horizontal direction in which each lifting transportation device 100 moves. Rails 24 may be arranged at each level for moving a container carriage 22 along a selected line of the storage cells so as to enable each container carriage 22 to carry containers in a direction substantially perpendicular to the direction in which the lifting transportation devices 100 move. As discussed in more detail later, the container carriages 22 are enabled to carry containers through the storage racks between the passages provided for moving the lifting transportation devices 100.

To avoid interferences between the container carriages 22 and the lifting transportation device 100 of the respective set, the rails 24 and the rails 20 are arranged at different levels with respect to the ground so as to provide movement of the respective container carriage 22 and the lifting transportation device 100 in different horizontal planes with respect to the ground. FIG. 1 shows that each container carriage 22 moves along a pair of rails 24. However, the container carriage 22 may be configured for moving along a single rail 24.

As discussed in more detail below, each container carriage 22 has a frame configured for moving along a respective pair of rails 24, and a board for carrying containers. The width of the board is less than the distance between the holding elements 18 in the storage racks so as to allow the container carriage 22 to pass between the holding elements 18. The container carriage 22 is configured for setting the board in an upper position or in a lower position.

Two rows of the storage cells above each pair of rails 24 at each level in each storage rack 12, 14 and 16 are configured for operations of the container carriages 22. The first row of the storage cells immediately above the rails 24 may be left empty, and the second row of the storage cells above the first row may be used by the transportation devices 100 for placing containers. For example, the lifting transportation devices G1 and G2 may take selected containers from the storage cells in the rows assigned to these lifting transportation devices, and place the selected containers into the storage cells of the second row above the lower rails 24 in FIG. 1. The lifting transportation devices G3 and G4 may place selected containers into the storage cells of the second row above the intermediate rails 24, and the lifting transportation devices G5 and G6 may place selected containers into the storage cells of the second row above the upper rails 24. Also, each lifting transportation device 100 is configured for taking selected containers from the storage cells of the second row and placing the selected containers into the storage cells of the other rows.

When the board of each container carriage 22 is in an upper position, the container carriage 22 is configured for accessing a selected storage cell in the second row with respect to the corresponding rail 24 so as to load on its board the container stored there. Also, the container carriage 22 is configured for placing a container carried on its board into a selected storage cell in the second row with respect to the corresponding rail 24 when its board is in the upper position. When the board of the container carriage 22 is in a lower position, the container carriage 22 is configured to carry a container below the second row of the storage cells so as to move the container through a storage rack.

The storage system 10 also includes lifting mechanisms 26 provided to receive containers from the container carriages 22 or to load containers to the container carriages 22. For example, as discussed in more detail below, one of the lifting mechanisms 26 in FIG. 1 may be configured to receive containers from the container carriages 22 arranged at different levels so as to provide a sequence of containers arranged in a predetermined order.

In an exemplary embodiment shown in FIG. 1, each lifting mechanism 26 includes a frame 28 and a multiple container supporting units 30 arranged at multiple levels corresponding to the levels at which respective container carriages 22 operate. The elements of the container supporting units 30 may be fixed at the respective rails 24. The container supporting units are configured for holding containers unloaded from the respective container carriages 22 or loaded onto the respective container carriages 22.

Also, each lifting mechanism 26 may include a platform 32 configured for moving in a vertical direction so as to take containers held by various container supporting units 30 or place containers onto various container supporting units 30. Also, the platform 32 is configured for supplying containers in a predetermined sequence to a container processing point arranged at a selected level, or for returning containers from the container processing point.

For example, FIG. 1 shows that containers in a predetermined sequence are supplied to a conveyor belt 34 used for container processing. In particular, the conveyer belt 34 may be used for preparing orders based on items collected from the containers placed on the conveyor belt 34.

Figure 2:
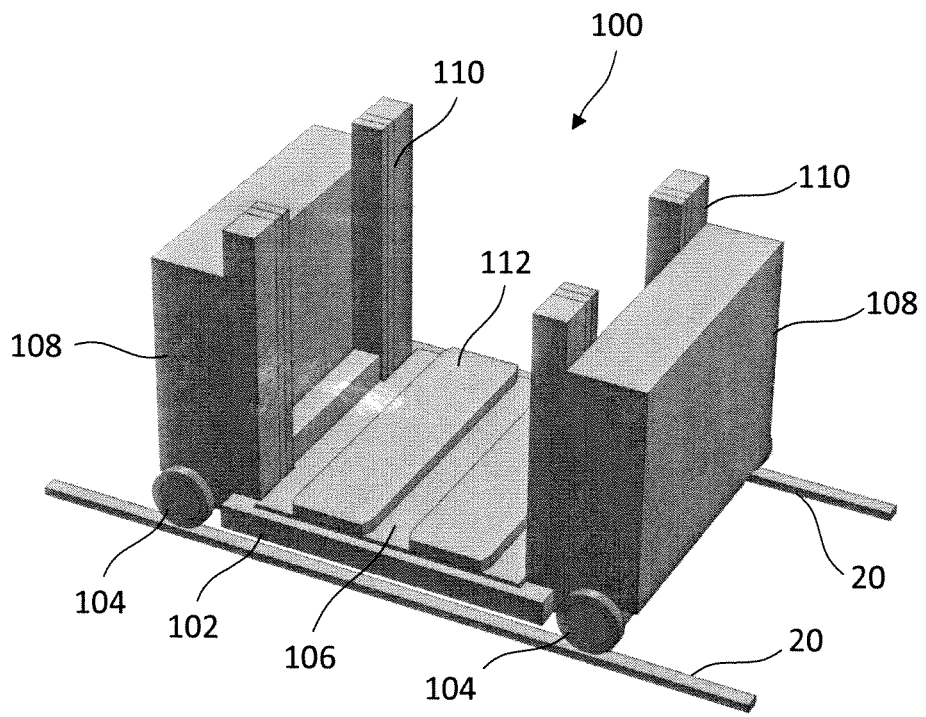
FIGS. 2-5 illustrate an exemplary lifting transportation device of the present disclosure.

FIGS. 2-5 schematically illustrate an exemplary embodiment of the lifting transportation device 100 that may be used in the storage system 10. As shown in FIG. 2, a lifting transportation device 100 may include a frame 102 with four wheels 104 fixed to the frame 102 which may be formed as a braced structure for supporting elements required to operate the lifting transportation device 100. Each wheel 104 may be attached to the frame 102 so as to rotate in a vertical plane about an axis extending from the center of the wheel 104 in order to move the transportation device 100 along the rails 20.

The frame 102 may hold a movable platform 106 that can be used for carrying containers. For example, the platform 106 may be a rectangular metal plate configured to accommodate containers. Side walls 108 may be provided on the frame 102 to support loading and carrying containers.

The platform 106 may move in a vertical direction up and down with respect to the frame 102 so as to access containers arranged in rows above and below the level at which the rails 20 are arranged. A platform lifting mechanism 110 may be arranged at the side walls 108 to move the platform 106 in a vertical direction. The platform lifting mechanism 110 may be implemented using any well-known mechanisms for moving a plate up and down. For example, a telescopic mechanism can be utilized.

One or more handling elements 112 may be mounted on the platform 106 and configured for operating with containers. The handling elements 112 may take one or more containers from one row of the storage rack, place the container onto the transportation unit 100 for carrying to another row, and remove the container from the transportation device 100 for placing it at a selected row. The handling elements 112 may be extended in a horizontal direction from one or both sides of the transportation device 100 so as to handle containers arranged at one storage rack or both storage racks served by the transportation device 100. For example, the handling elements 112 may be implemented as a metal plate, spade, fork or pulling device.

Figure 3:
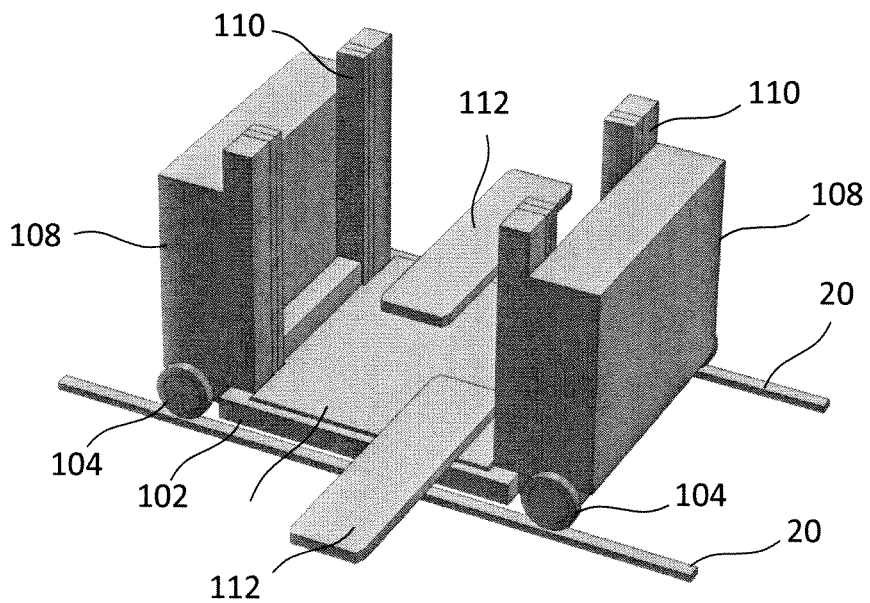
Figure 4:
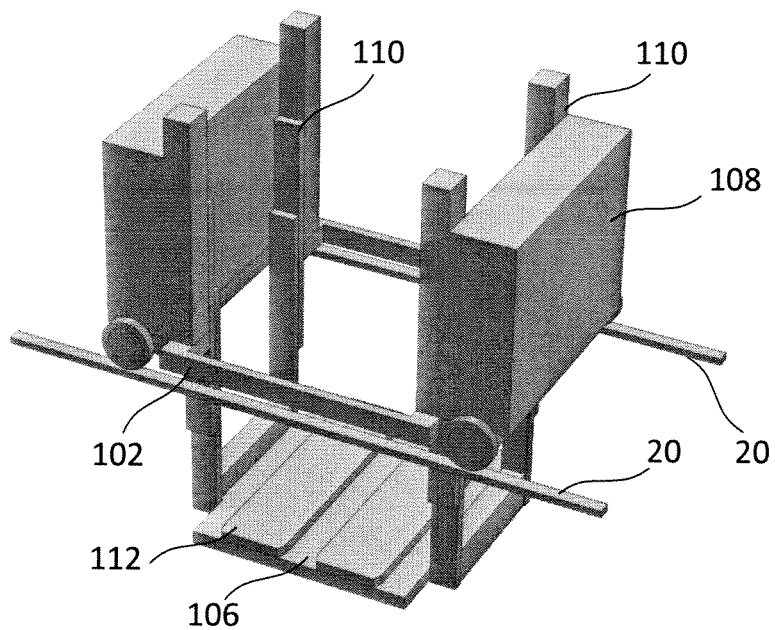
Figure 5:
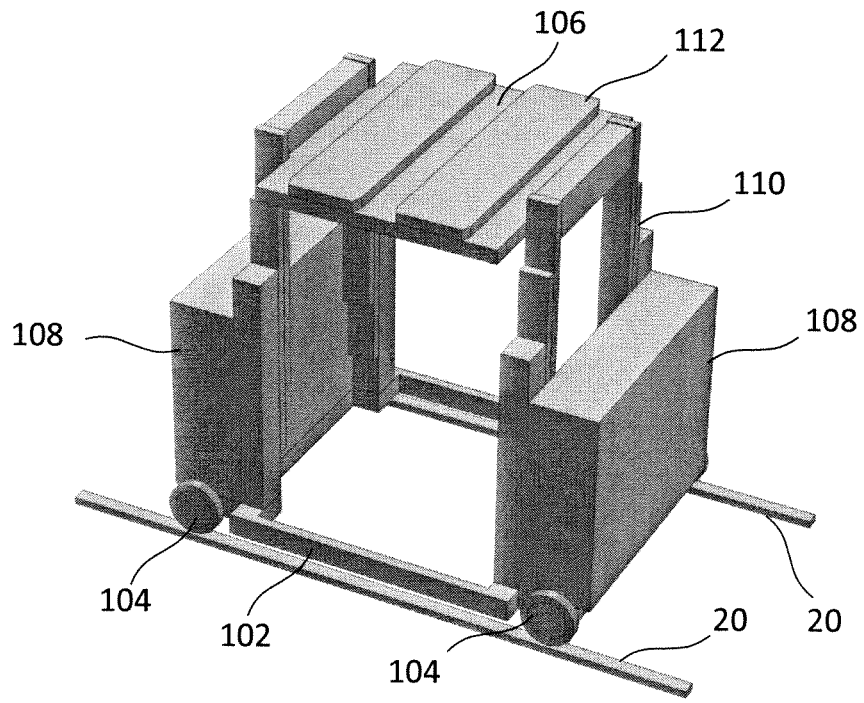

FIG. 3 illustrates the lifting transportation device 100 with the handling elements 112 extended from both sides of the lifting transportation device 100. FIG. 4 illustrates the lifting transportation device 100 with the movable platform 106 moved down with respect to the frame 102 so as to handle containers arranged in rows below the level of the corresponding rails 20. FIG. 5 illustrates the lifting transportation device 100 with the movable platform 106 raised with respect to the frame 102 so as to handle containers arranged in rows above the level of the corresponding rails 20.

The operations of the lifting transportation device 100 may be controlled by a controller that may include a data processor responsive to external commands for processing the commands and producing various control signals. The controller may communicate with various elements of the lifting transportation unit 100 to supply control signals to the elements of the transportation unit 100 and receive responses.

FIGS. 2-5 show a lifting transportation device 100 having the wheels 104 attached at the lower portion of the frame 102. However, the wheels 104 may be attached at the upper portion of the frame 102 or at the middle portion of the frame 102.

Figure 6:
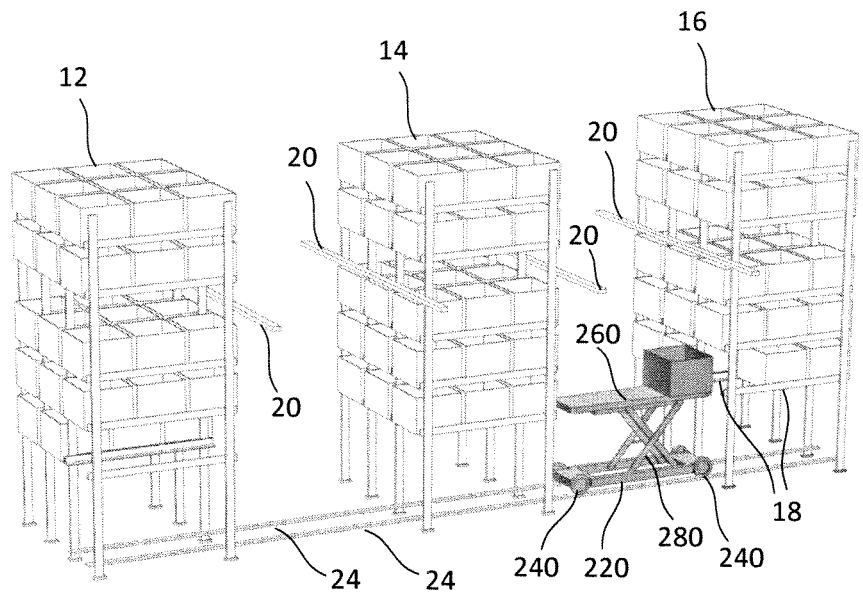
FIGS. 6 and 7 illustrate an exemplary embodiment of a container carriage of the present disclosure.
Figure 7:
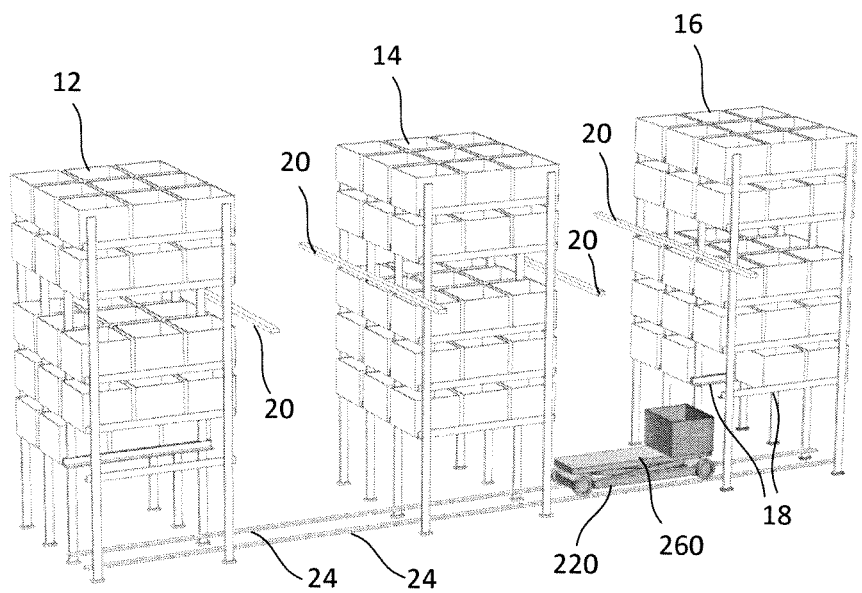

FIGS. 6 and 7 illustrate an exemplary embodiment of the container carriage 22 that may include a frame 220 with four wheels 240 fixed to the frame 220 which may be formed as a braced structure for supporting elements required to operate the container carriage 22. Each wheel 240 may be attached to the frame 220 so as to rotate in a vertical plane about an axis extending from the center of the wheel 240 in order to move the container carriage 22 along the rails 24.

The frame 220 may hold a board 260 that can be used for carrying containers. For example, the board 260 may be a rectangular metal plate configured to accommodate containers. A pantographic mechanism 280 may be provided on the frame 220 to raise the board 260 with respect to the frame 220 to an upper horizontal position, as shown in FIG. 6, or to move the board 260 down to a lower position illustrated in FIG. 7.

The width of the board 260 is less than the distance between the holding elements 18 in the storage racks so as to allow the container carriage 22 to pass between the holding elements 18. As illustrated in FIG. 7, the container carriage 22 may be moved along the rails 24 to position the board 260 below a selected storage cell arranged in the second row with respect to the corresponding rails 24. Then, the board 260 may be raised to a level slightly above the holding elements 18 so as to take a containers held in the selected storage cell.

Alternatively, the container carriage 22 carrying a container on its board 260 may be positioned in a passage between the storage racks near a selected storage cell. The board 260 may be raised to a level slightly above the holding elements 18, and the container carriage 22 may be moved towards the selected storage cell so as to place the carried container into the selected storage cell.

Further, as illustrated in FIG. 7, when the board 260 is in a lower horizontal position, the container carriage 22 carrying the container is able to move below the storage cells arranged in the second row with respect to the corresponding rails 24. As a result, the container carriages 22 at various levels are enabled to carry containers through storage racks 12, 14 and 16.

For example, the container carriage 22 is able to take containers from the storage rack 16 and carry the containers through the storage racks 14 and 12 to the respective container supporting unit 30 of the lifting mechanism 26. As described in more detail later, when the board 260 is in an upper position, the container carriage 22 is able to load a container onto the container supporting elements of the unit 30.

Operations of an exemplary transportation device 100 and/or an exemplary container carriage 22 that can be used in the storage system 10 are described in more detail in my copending U.S. patent application Ser. No. 14/049,552 filed on Oct. 9, 2013 and entitled "AUTOMATIC ORDER PICKING SYSTEM AND METHOD IN RETAIL FACILITY," my copending U.S. patent application Ser. No. 14/155,976 filed on Jan. 15, 2014 and entitled "TRANSFERRING CONTAINERS IN STORAGE SYSTEM," my copending U.S. patent application Ser. No. 14/178,024, filed on Feb. 11, 2014, entitled "MULTI-LEVEL STORAGE SYSTEM WITH TRANSPORTATION DEVICES MOVABLE IN SUBSTANTIALLY PERPENDICULAR DIRECTIONS AND METHOD OF TRANSFERRING CONTAINERS IN DESIRED SEQUENCE," my copending U.S. patent application Ser. No. 14/299,527, filed on Jun. 9, 2014 and entitled "ORDER PICKING STATION AND METHOD OF ORDER PICKING," and my copending U.S. patent application Ser. No. 14/333,199, filed on Jul. 16, 2014 and entitled "LOADING DESIRED CONTAINER SEQUENCE ONTO BOARD OF CONTAINER CARRIAGE IN STORAGE SYSTEM," all incorporated herewith by reference.

Figure 8:
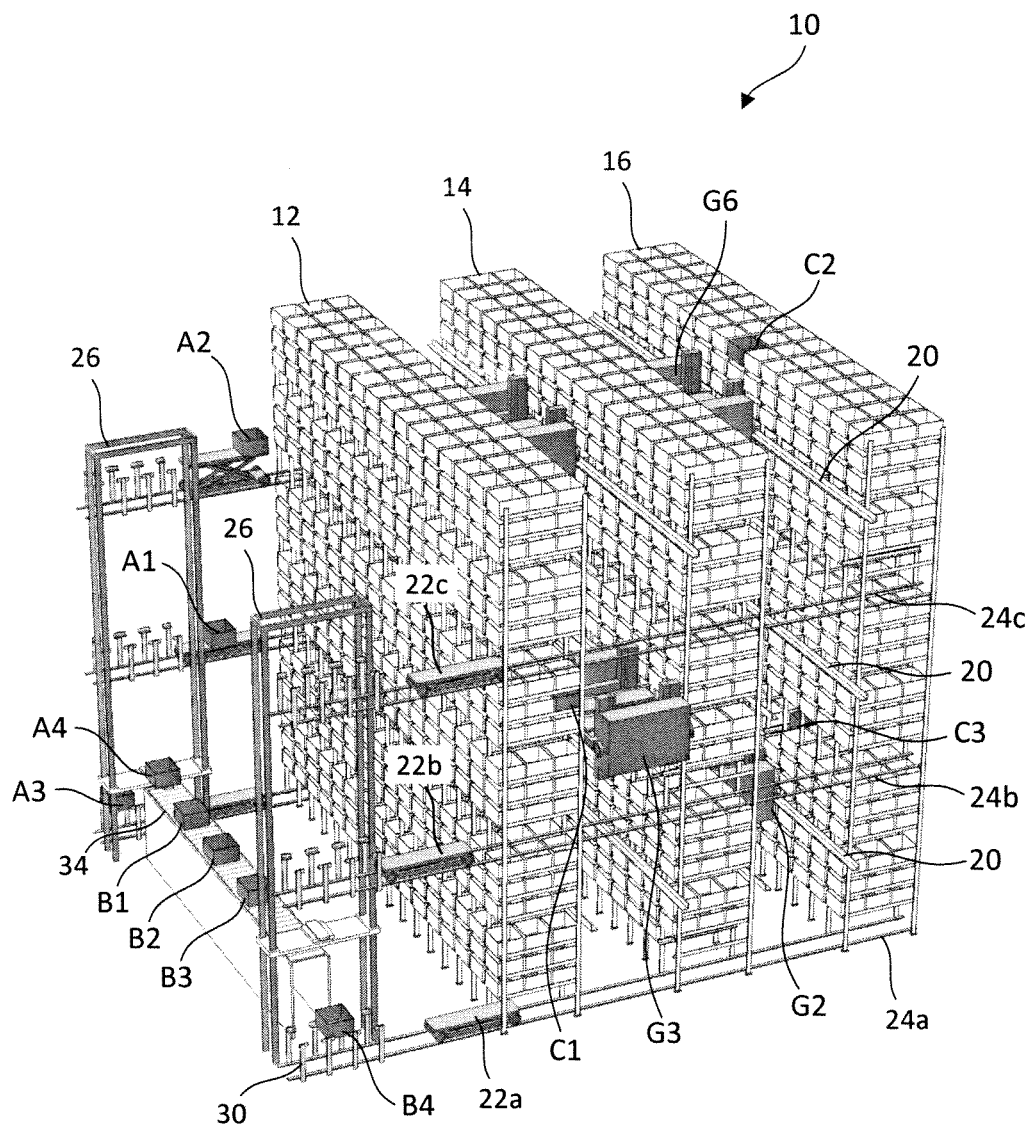
FIGS. 8-19 illustrate exemplary operations performed to collect containers from various storage racks and supply a predetermined sequence of containers to a container processing point.

FIGS. 8-19 illustrate exemplary operations of the storage system 10. The illustrated operations may be controlled by a control unit programmed to produce control signals supplied to the elements of the storage system 10. In an illustrated example, the storage system 10 provides a first container sequence including containers A1, A2, A3 and A4, a second container sequence including containers B1, B2, B3 and B4, and a third container sequence including containers C1, C2 and C3. FIG. 8 illustrates that the container sequence A1-A4 is being returned from the conveyor belt 34 to desired storage cells in the storage racks 12, 14 and 16. The containers B1, B2 and B3 are carried by the conveyor belt 34 in a predetermined order, in which the container B2 follows the container B1, and the container B3 follows the container B2. The container B4 is placed on container supporting elements of the unit 30, before being supplied to the conveyor belt 34 so as to follow the container B3.

The disclosure below presents an example in which the containers C1, C2 and C3 are being collected from various storage cells to form a desired sequence in which the container C2 follows the container C1, and the container C3 follows the container C2. For instance, the container C1 is collected from the storage rack 12, while the containers C2 and C3 are collected from the storage rack 16 separated from the storage rack 12 by the storage rack 14. In the described example, the container C1 is stored in the storage row of the storage row group assigned to the lifting transportation device G3, the container C2 is stored in the storage row of the group assigned to the lifting transportation device G6 and the container C3 is stored in the storage row of the group assigned to the lifting transportation device G2. Container carriages 22a, 22b and 22c movable along the respective rails 24a, 24b and 24c arranged at different levels, interact with the lifting transportation devices G2, G3 and G6 to collect the containers C1-C3.

Figure 9:
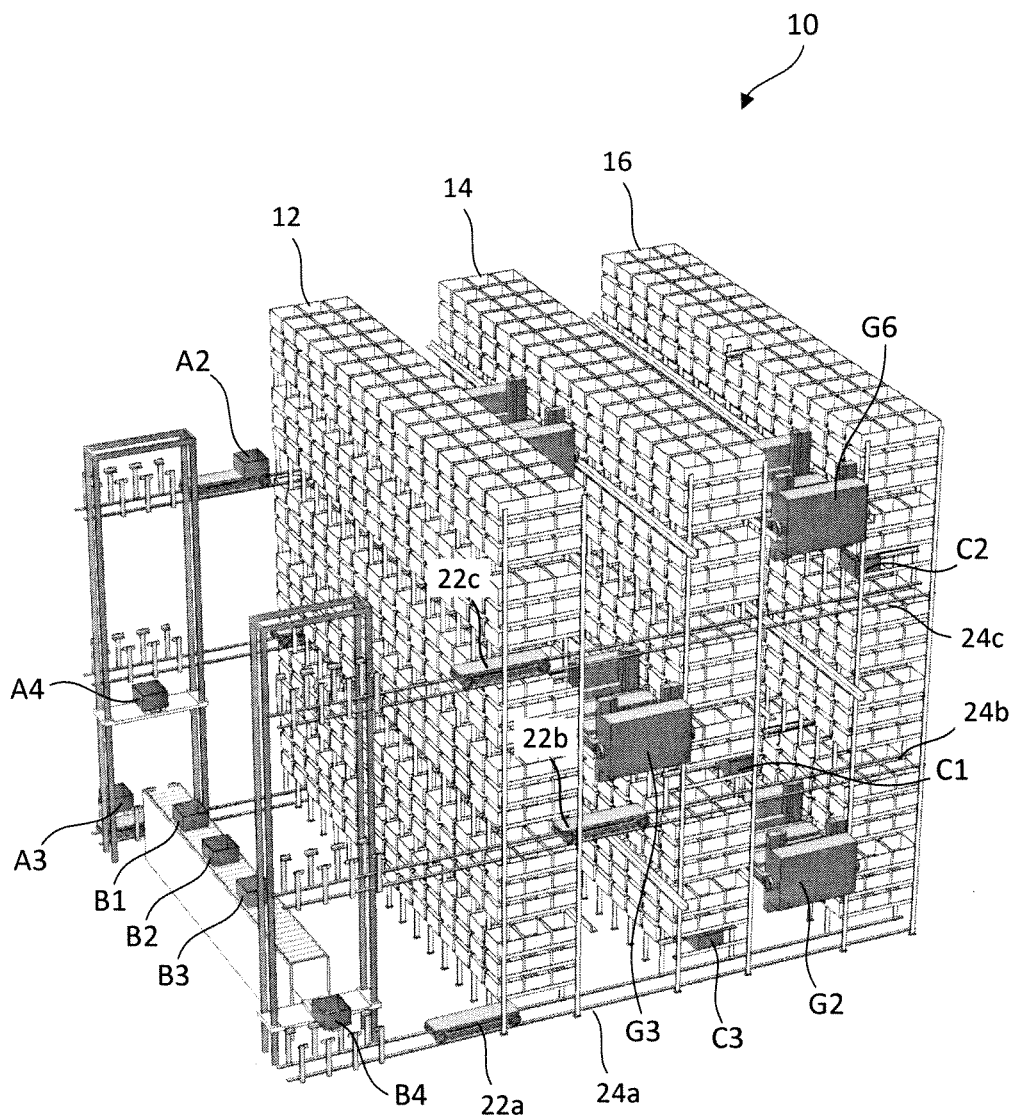

As illustrated in FIG. 9, the lifting transportation device G3 takes the container C1 from the storage rack 12 and places it into the storage rack 14 in a selected storage cell accessible by the container carriage 22b. This storage cell is arranged in the second storage row with respect to the rails 24b. At the same time, the container C2 is moved by the lifting transportation device G6 to a selected storage cell of the storage rack 16 accessible by the container carriage 22c. This storage cell is arranged in the second storage row with respect to the rails 24c. Also, the container C3 is moved by the lifting transportation device G2 to a selected storage cell of the storage rack 14 accessible by the container carriage 22a. This storage cell is arranged in the second storage row with respect to the rails 24a.

Figure 10:
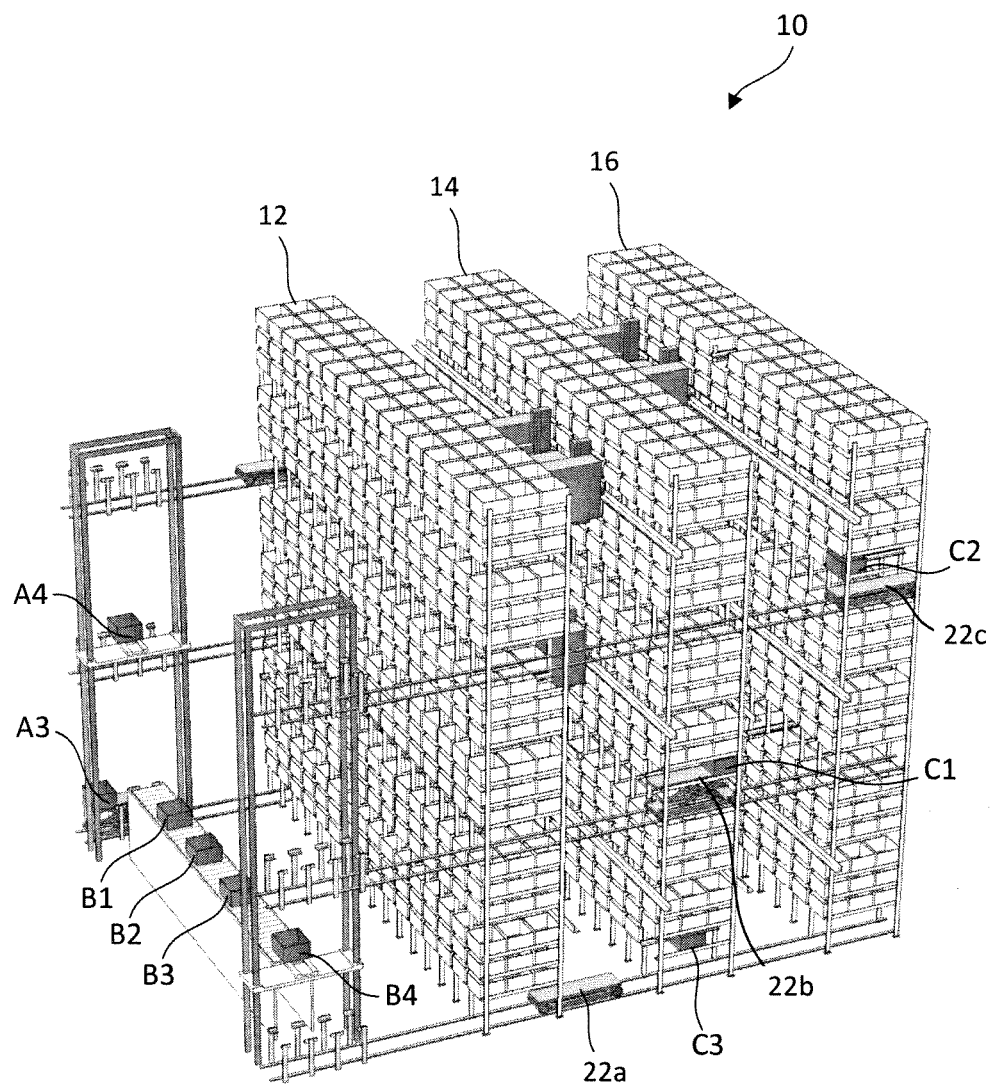

Referring to FIG. 10, the container carriage 22b is moved to a position below the selected storage cell in which the container C1 is placed, and the container carriage 22c is moved to a position below the selected storage cell in which the container C2 is placed. As shown in FIG. 10, the board of the container carriage 22b is placed into an upper position to take the container C1 onto the board. The board of the container carriage 22c is in a lower position to allow the container carriage to move below the storage raw in which the container C2 is placed.

Figure 11:
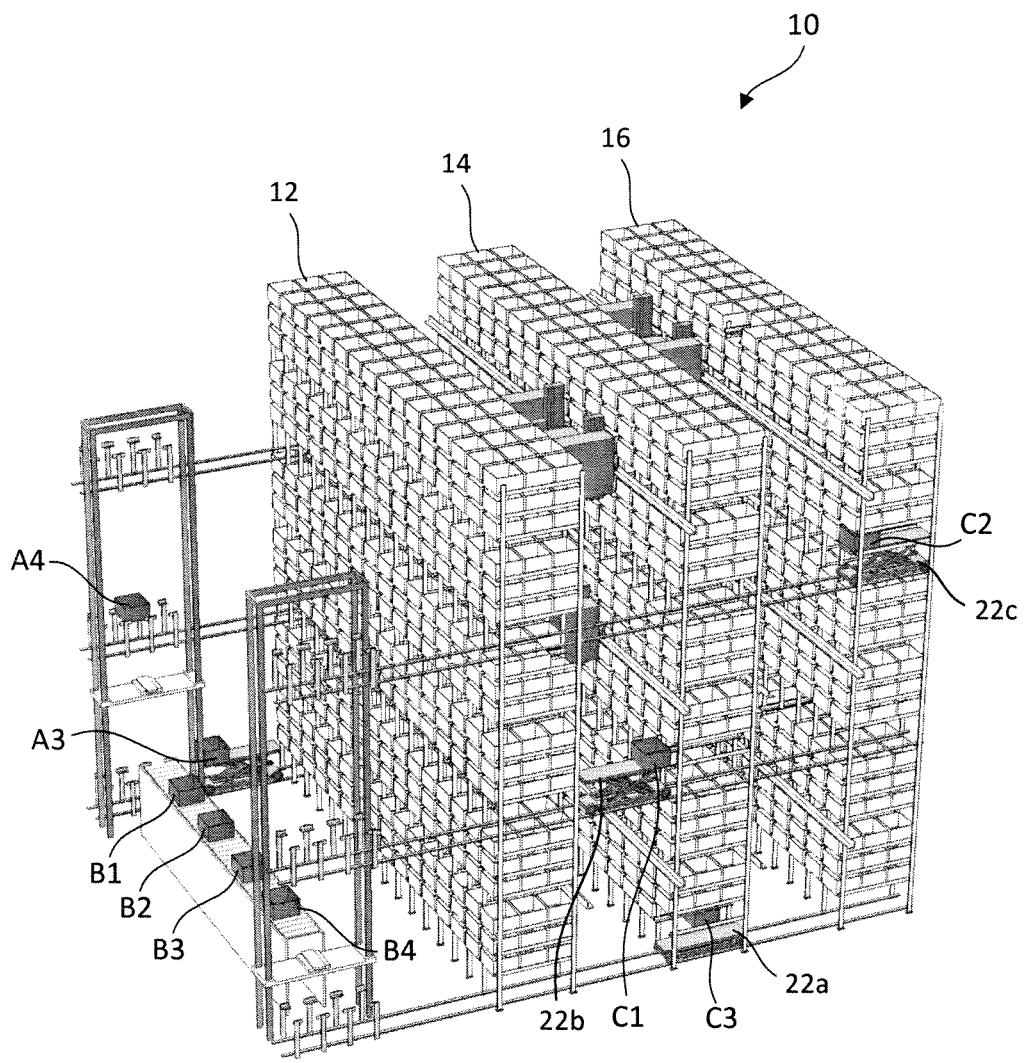

As shown in FIG. 11, the container carriage 22b with the container C1 on its board is moved to the passage between the racks 12 and 14. At the same time, the board of the container carriage 22c is placed into an upper position to load the container C2 onto the board. The container carriage 22a with its board in a lower position is moved below the row in which the container C3 is placed so as to reach a position below the container C3.

Figure 12:
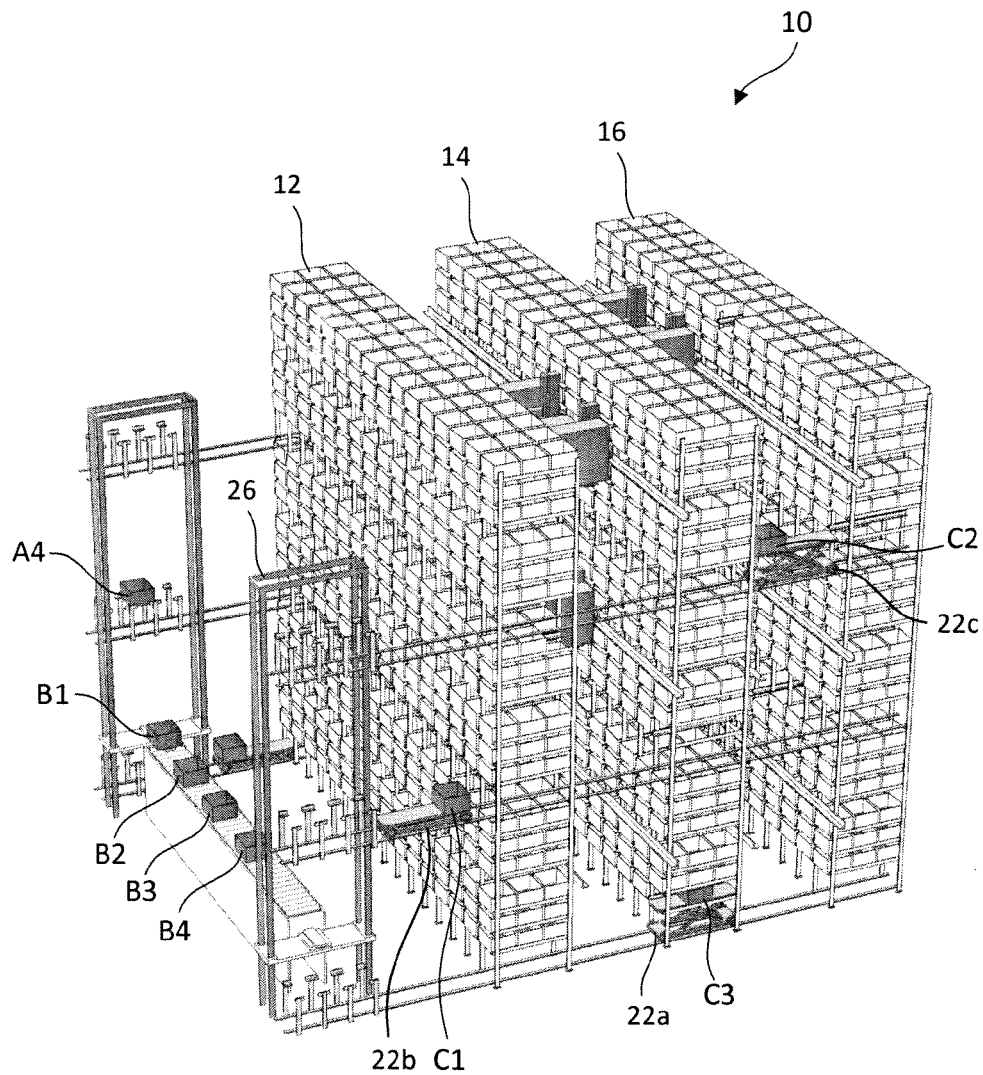

Referring to FIG. 12, the board of the container carriage 22b carrying the container C1 is placed into a lower position to enable the container carriage 22b to move through the storage rack 12 to a position near the lifting mechanism 26. The container carriage 22c carrying the container C2 is positioned in the passage between the storage racks 14 and 16. The board of the container carriage 22a is placed into an upper position to load the container C3 on the board.

Figure 13:
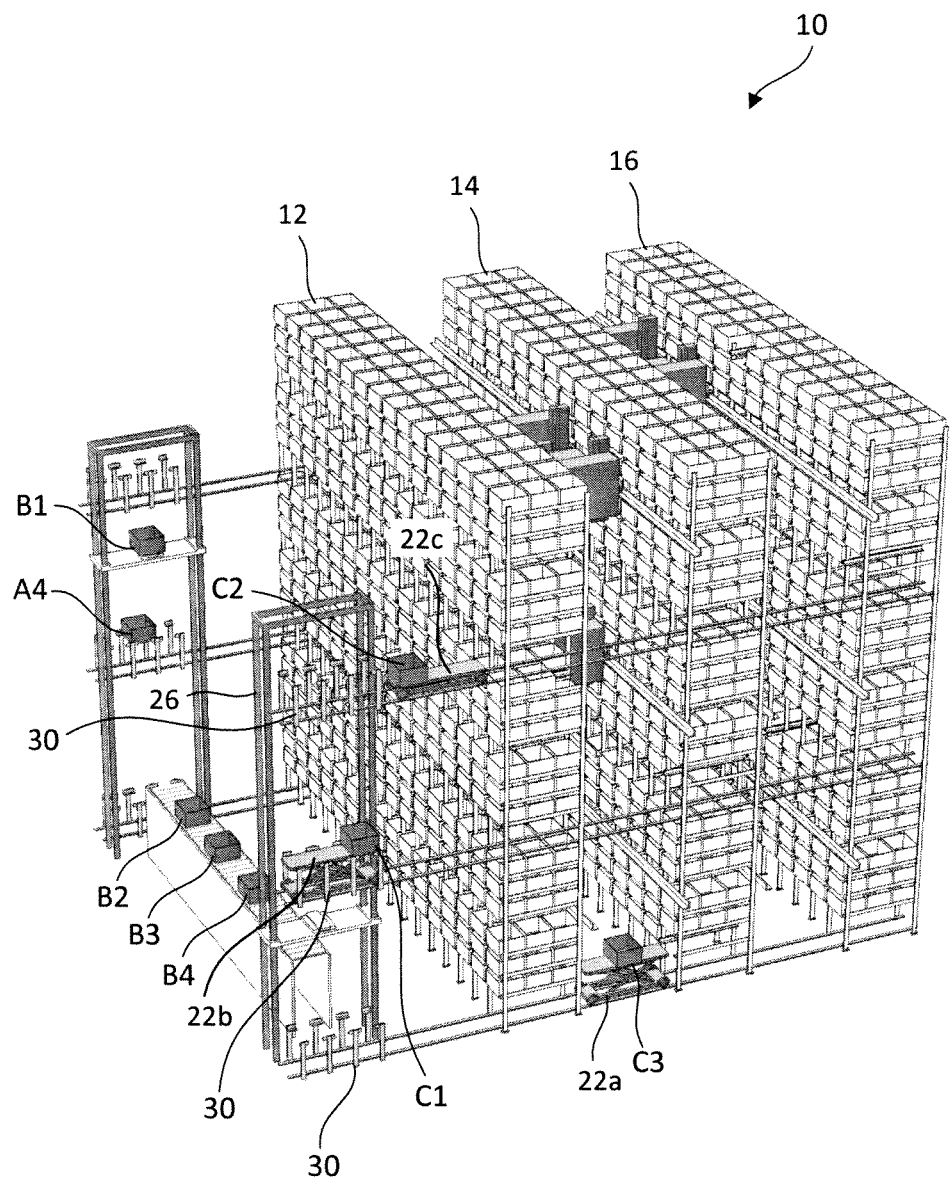

Further, as illustrated in FIG. 13, the board of the container carriage 22b is placed into an upper position, and the container carriage 22b is moved into the respective container supporting unit 30 to place the container C1 onto the container supporting elements of that unit. The board of the container carriage 22c carrying the container C2 is placed into a lower position to enable the container carriage 22c to move through the storage racks 14 and 12 to a location near the lifting mechanism 26. The container carriage 22a carrying the container C3 is moved to the passage between the storage racks 12 and 14.

Figure 14:
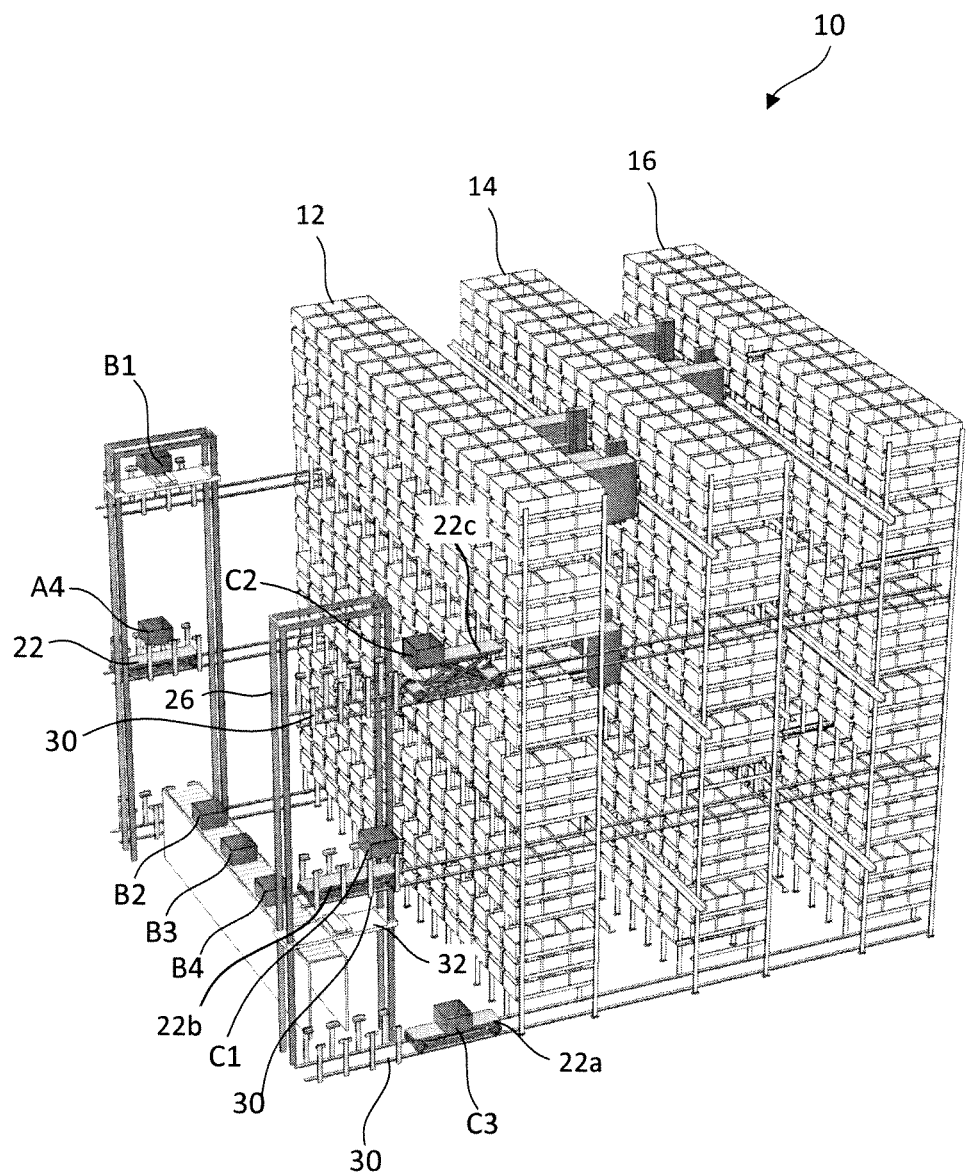

Referring to FIG. 14, the board of the container carriage 22b is moved to a lower position to leave the container C1 on the container supporting elements of the respective container supporting unit 30. The board of the container carriage 22c is moved to an upper position to allow the container carriage 22c to place the container C2 onto the container supporting elements of the respective container supporting unit 30. The board of the container carriage 22a is placed into a lower position to allow the container carriage 22a to move through the storage rack 12 to a position near the lifting mechanism 26.

Figure 15:
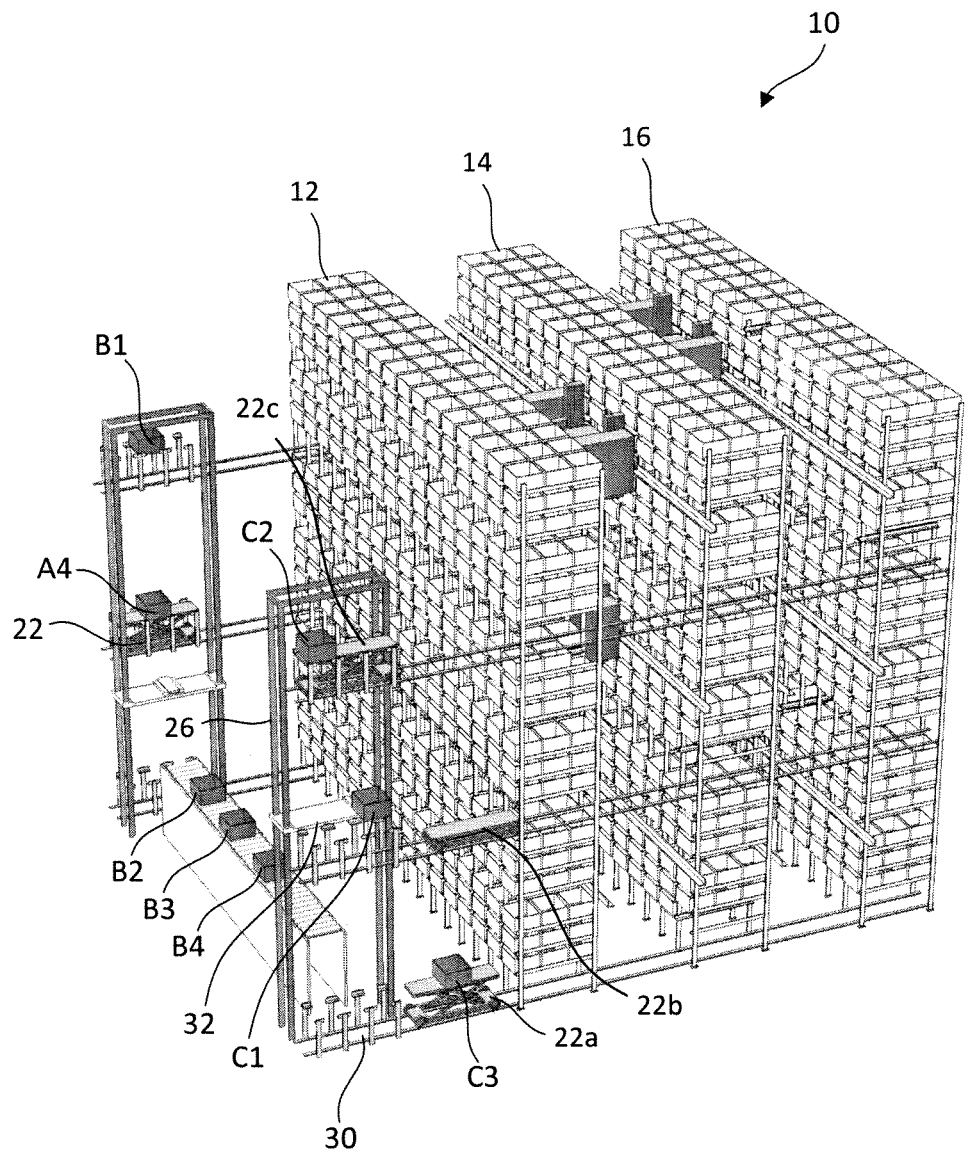

Further, as shown in FIG. 15, the platform 32 of the lifting mechanism 26 is moved in a horizontal direction to remove the container C1 from the container supporting elements of the unit 30 and place the container C1 onto the platform 32. The width of the platform 32 may be less than the distance between opposite container supporting elements so as to allow the platform 32 to move up and place a container onto the platform 32. The container carriage 22b is moved to collect another selected container. The container carriage 22c is moved into the respective container supporting unit 30 to place the container C2 onto its container supporting elements. The board of the container carriage 22a is moved into an upper position to place the container C3 on the container supporting elements of the respective unit 30.

Figure 16:
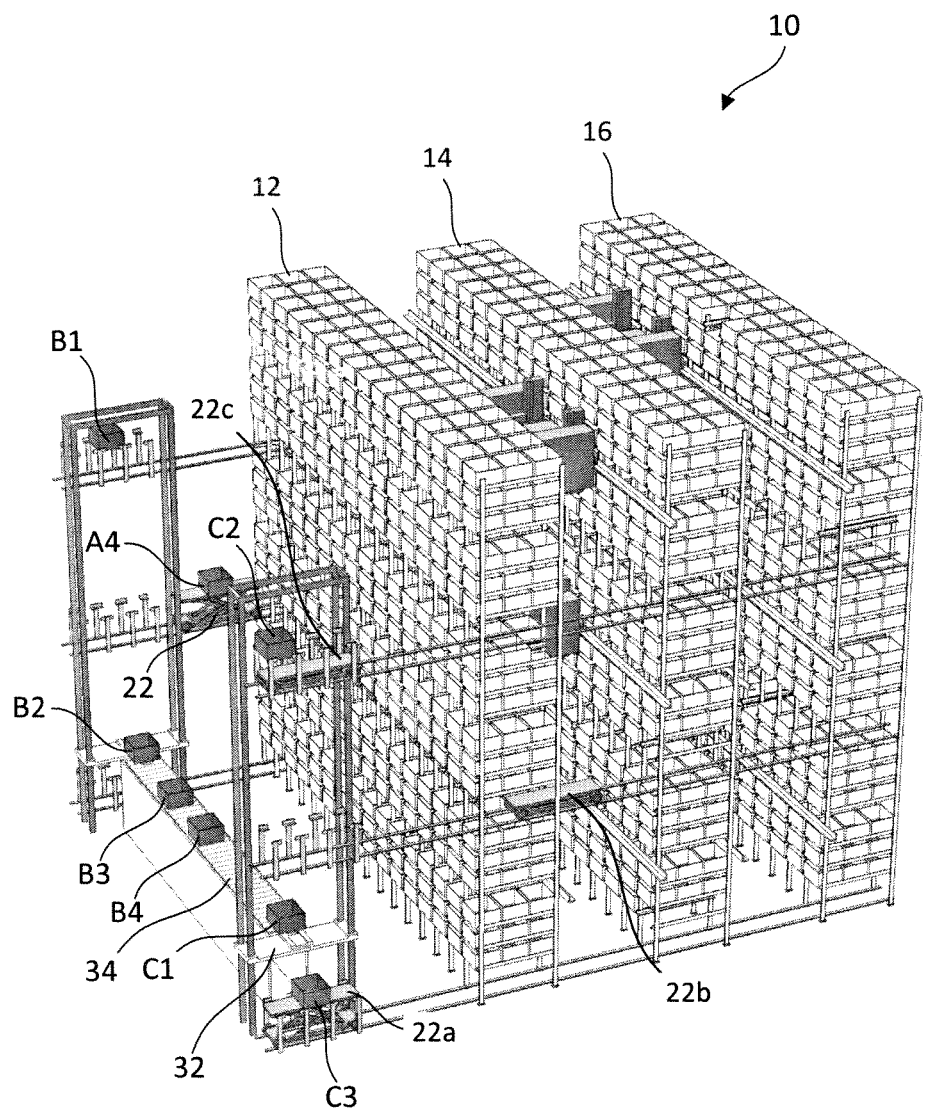

Referring to FIG. 16, the platform 32 is moved in a horizontal direction to a level of the conveyor belt 34 so as to place the container C1 onto the conveyor belt 34. For example, the platform 32 may have a handling element enabling the platform 32 to place containers onto the conveyor belt 34 or to take containers from the conveyor belt 34. The handling element of the platform 32 may be implemented as a metal plate, spade, fork or pulling device.

At the same time, the board of the container carriage 22c is placed in a lower position so as to leave the container C2 held by the container supporting elements of the unit 30. The container carriage 22a is moved into the respective container supporting unit 30 to place the container C3 onto its container supporting elements.

Figure 17:
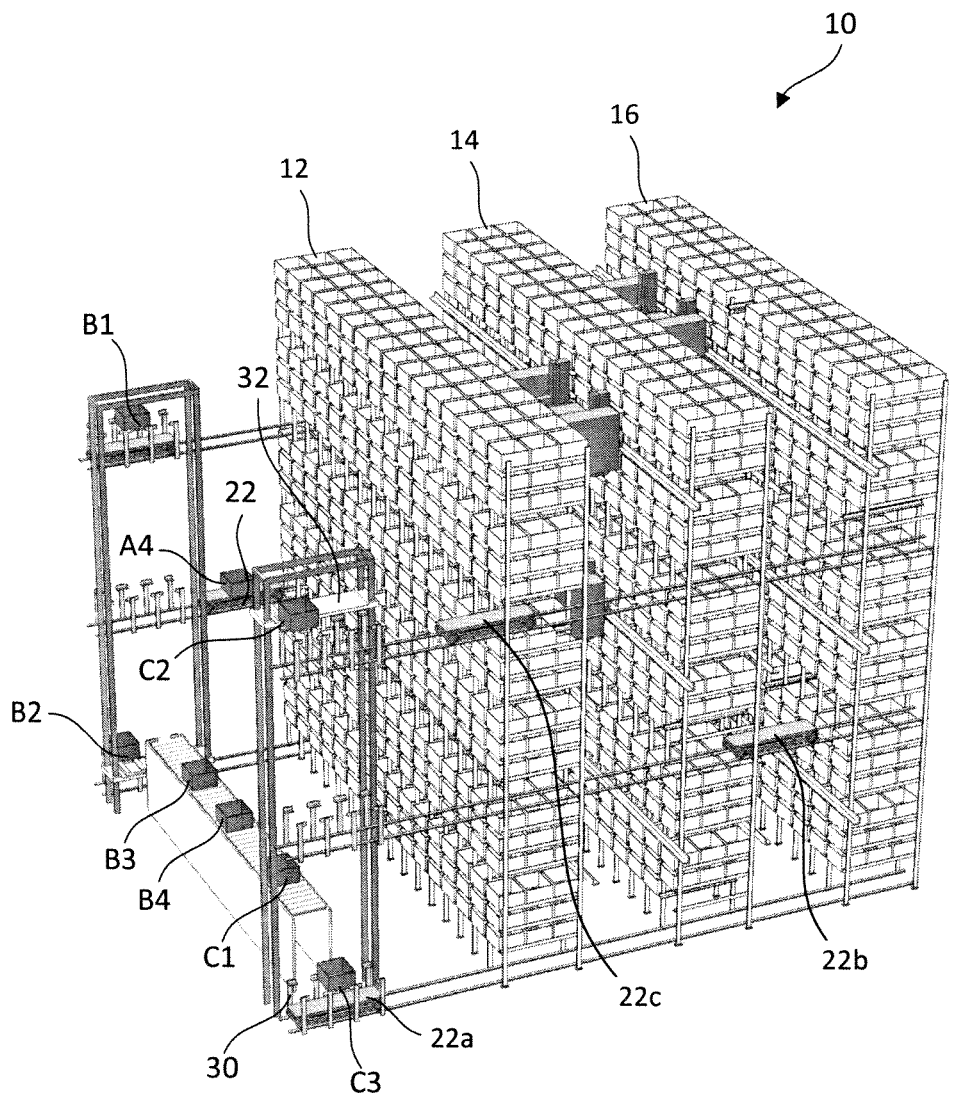

Referring to FIG. 17, the container C1 is carried by the conveyor belt 34. At the same time, the platform 32 is moved up to take the container C2. The container carriage 22c is moved to continue container collection operations. The board of the container carriage 22a is placed into a lower position to leave the container C3 held by the container supporting elements of the respective unit 30.

Figure 18:
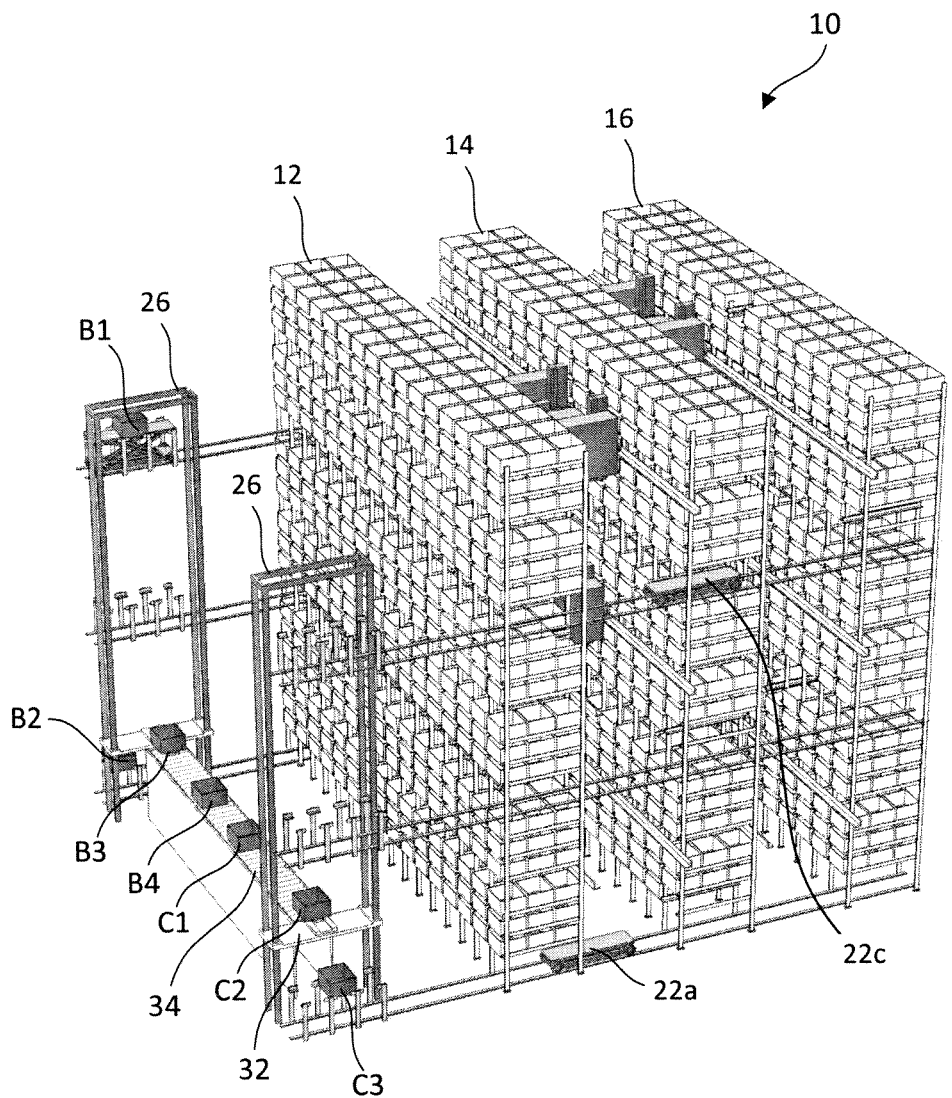

Further, as shown in FIG. 18, the platform 32 is moved in a vertical direction to place the container C2 onto the conveyor belt 34 so as to allow the conveyor belt 34 to carry the container C2 after the container C1. The container C3 is held by the container supporting elements of the respective unit 30. The container carriage 22a is moved to continue container collection operations.

Figure 19:
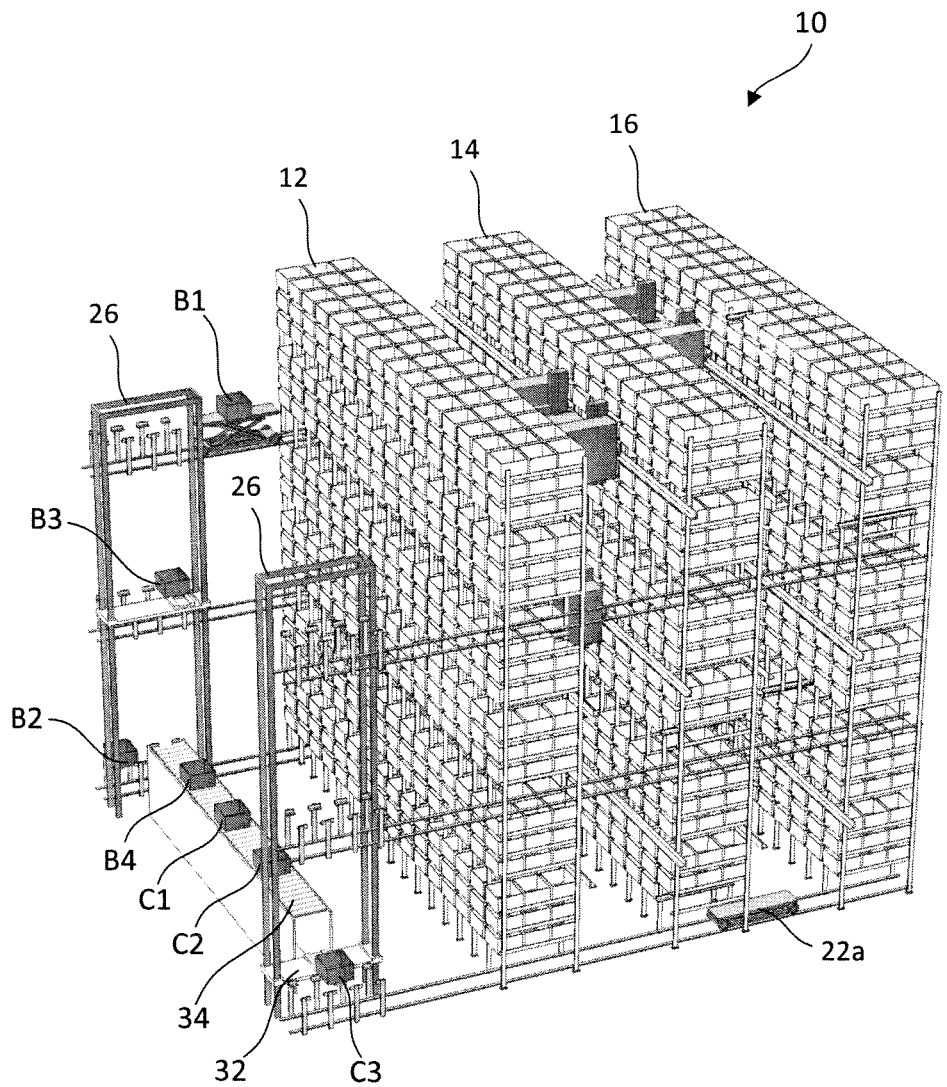

Finally, as illustrated in FIG. 19, the platform 32 takes the container C3 to place it to the conveyor belt 34 after the container C2. As a result, the storage system 10 provides a sequence of containers C1, C2 and C3 that can be processed in a predetermined order.

As illustrated in FIGS. 8-19 with an example of container sequences A1-A4 and B1-B4, when containers of a container sequence are processed, they may be returned in a predetermined order to desired storage cells in the storage racks 12, 14 and 16. An additional lifting mechanism 26 may be provided for taking containers from the conveyor belt 34 and loading them onto respective container carriages 22. For example, FIGS. 8-17 illustrate how the additional lifting mechanism 26 sequentially takes containers A1 to A4 from the conveyor belt 34 and places them onto boards of the respective container carriages 22. Thereafter, the container carriages 22 carry the containers to desired storage racks 12, 14 and 16 and place the containers into selected storage cells accessible by the respective container carriages 22. The respective lifting transportation devices 100 take the containers from the selected storage cells and place them into desired storage cells of desired storage racks.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A storage system comprising:
    multiple storage sections, each configured for storing containers in storage cells arranged in multiple rows at various levels with respect to ground;
    multiple sets of lifting transportation devices configured for moving in a first horizontal direction along pairs of first rails arranged at respective first predetermined levels in passages between adjacent storage sections;
    multiple container carriages corresponding to respective sets of the lifting transportation devices and configured for moving in a second horizontal direction substantially perpendicular to the first horizontal direction, along second rails arranged at respective second predetermined levels different from the first predetermined levels, and
    a lifting sequencer configured for moving in a vertical direction to receive containers from the multiple container carriages and provide a sequence of containers arranged in a predetermined order, wherein
    each lifting transportation device of a set includes a container access mechanism movable in a vertical direction with respect to a corresponding pair of the first rails so as to take a container stored in the adjacent storage sections and place the container to a selected storage cell accessible by a container carriage corresponding to the set,
    a first lifting transportation device of the set movable along a first passage between the storage sections is configured to place a container to a first selected storage cell accessible by the container carriage corresponding to the set, and a second lifting transportation device of the set movable along a second passage between the storage sections is configured to place a container to a second selected storage cell accessible by the container carriage corresponding to the set,
    the container carriage has a frame configured for moving along a respective second rail, and a board for carrying containers, the container carriage is configured to set the board at first and second horizontal positions with respect to the frame, where the first horizontal position is higher than the second horizontal position,
    when the board is set at the first horizontal position, the container carriage is configured to access the first and second selected storage cells, and
    when the board is set at the second horizontal position, the container carriage is configured to carry containers between the first passage and the second passage under a selected row of storage cells arranged above the respective second rail.

2. The system of claim 1, wherein each container carriage is configured to supply the lifting sequencer with containers collected from multiple storage sections separated by at least one passage.

3. The system of claim 1, wherein the lifting sequencer includes a lifting platform movable in a vertical direction to take containers from multiple container supporting units respectively arranged at multiple levels corresponding to the second predetermined levels at which the second rails are arranged.

4. The system of claim 3, wherein the lifting sequencer is configured to supply the containers taken by the lifting platform to a container processing section.

5. The system of claim 4, further comprising a return lifting sequencer configured for returning containers processed in the container processing section to the storage sections.

6. The system of claim 5, wherein the return lifting sequencer is configured for returning the processed containers in a desired order.

7. The system of claim 1, wherein each lifting transportation device is configured to access multiple rows of storage cells arranged above the corresponding pair of the first rails, and to access multiple rows of storage cells arranged below the corresponding pair of the first rails.

8. A method of supplying containers for processing in a storage system having multiple storage sections, each configured for storing containers in storage cells arranged in multiple storage rows at various levels with respect to ground; multiple sets of lifting transportation devices configured for moving in a first horizontal direction in passages between adjacent storage sections; multiple container carriages corresponding to respective sets of the lifting transportation devices and configured for moving in a second horizontal direction substantially perpendicular to the first horizontal direction; and a lifting sequencer, the method comprising the steps of:
    controlling a first lifting transportation device of a first set of the lifting transportation devices to take a first container stored in a first storage section in a first group of storage rows assigned to the first lifting transportation device;
    controlling a second lifting transportation device of a second set of the lifting transportation devices to take a first container stored in a second storage section in a second group of storage rows assigned to the second lifting transportation device, the first group of storage rows being arranged at a different level than the second group of storage cells, the first and second storage sections being separated by a third storage section;

controlling the first lifting transportation device to place the first container to a first selected storage cell accessible by a first container carriage corresponding to the first set, controlling the second lifting transportation device to place the second container to a second selected storage cell accessible by a second container carriage corresponding to the second set;

positioning a board of the first container carriage in an upper position to take the first container from the first selected storage cell, positioning the board of the first container carriage in a lower position to carry the first container below a selected storage row in the third storage section to a first selected container receiving point, controlling the second container carriage to take the second container from the second selected storage cell and carry the second container to a second selected container receiving point arranged at a different level than the first selected container receiving point, and controlling the lifting sequencer to move in a vertical direction to access the first and second selected receiving points so as to receive the first and second containers and supply the first and second containers for processing in a predetermined sequence.

9. The method of claim 8, wherein after the processing, the first and second containers are returned to the storage sections in a desired order.

10. The method of claim 8, wherein the first group of storage rows includes multiple storage rows arranged above a first horizontal path along which the first lifting transportation device moves, and multiple storage rows arranged below the first horizontal path.

11. The method of claim 10, wherein the second group of storage rows includes multiple storage rows arranged above a second horizontal path along which the second lifting transportation device moves, and multiple storage rows arranged below the second horizontal path.

12. The method of claim 11, wherein the first horizontal path is provided at a different level than the second horizontal path.

* * * * *